(12) United States Patent
Gurcan et al.

(10) Patent No.: US 7,836,399 B2
(45) Date of Patent: Nov. 16, 2010

(54) DETECTION OF LISTS IN VECTOR GRAPHICS DOCUMENTS

(75) Inventors: Ahmet Gurcan, Mercer Island, WA (US); Eric S. Leese, Seattle, WA (US); Jeffrey G. Brown, Auburn, WA (US); Jerry J. Dunietz, Seattle, WA (US); Jesse D. McGatha, Sammamish, WA (US); Khaled S. Sedky, Sammamish, WA (US); Ming Liu, Redmond, WA (US); Oliver H. Foehr, Mercer Island, WA (US); Rodrigo Lopez, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 11/351,065

(22) Filed: Feb. 9, 2006

(65) Prior Publication Data

US 2007/0185837 A1 Aug. 9, 2007

(51) Int. Cl.
*G06F 17/27* (2006.01)
(52) U.S. Cl. ............... 715/249; 715/243; 715/244; 715/245; 715/246; 715/247
(58) Field of Classification Search .......... 715/243–253
See application file for complete search history.

(56) References Cited

U.S. PATENT DOCUMENTS

| 5,517,578 | A  | * | 5/1996  | Altman et al. ............. 382/181 |
| 5,613,019 | A  | * | 3/1997  | Altman et al. ............. 382/311 |
| 6,209,124 | B1 | * | 3/2001  | Vermeire et al. ........... 717/114 |
| 6,430,624 | B1 | * | 8/2002  | Jamtgaard et al. .......... 709/246 |
| 6,782,380 | B1 |   | 8/2002  | Thede                              |
| 6,487,566 | B1 |   | 11/2002 | Sundaresan                         |
| 6,587,587 | B2 | * | 7/2003  | Altman et al. ............. 382/181 |
| 7,203,903 | B1 | * | 4/2007  | Thompson et al. .......... 715/203 |
| 7,295,708 | B2 | * | 11/2007 | Chen et al. ............... 382/181 |
| 7,394,935 | B2 | * | 7/2008  | Chen et al. ............... 382/181 |
| 2002/0090118 | A1 |   | 7/2002  | Pass                             |

(Continued)

FOREIGN PATENT DOCUMENTS

EP 1107169 A2 6/2007

(Continued)

OTHER PUBLICATIONS

Jennifer Alspach; Adobe Acrobat 7 for Windows and Macintosh: Visual Quickstart Guide; Jan. 2006; Peachpit Press, pp. 60-61, 65-66, and 75.*

(Continued)

*Primary Examiner*—Doug Hutton
*Assistant Examiner*—Andrew R Dyer

(57) ABSTRACT

Various technologies and techniques detect lists in vector graphics based documents and use them in meaningful ways. The system detects at least one list in a vector graphics based document using a set of rules. Pattern detection logic identifies characters, symbols, numbers, letters, and/or images that may start a list. Additional pattern detection logic determines if a list exists. The system can identify and parse bulleted lists, numbered or lettered lists, and nested lists that are any combination of both. Once identified, the content is translated into a modified format. The content can be output to a destination application in the modified format that is more suitable for output or use by the destination application.

20 Claims, 11 Drawing Sheets

U.S. PATENT DOCUMENTS

| | | | |
|---|---|---|---|
| 2002/0178007 A1* | 11/2002 | Slotznick et al. ......... | 704/270.1 |
| 2002/0178135 A1 | 11/2002 | Tanaka | |
| 2004/0093355 A1* | 5/2004 | Stinger ................... | 707/104.1 |
| 2005/0022115 A1 | 1/2005 | Baumgartner | |
| 2005/0108630 A1 | 5/2005 | Wasson | |
| 2005/0132342 A1 | 6/2005 | Van Lunteren | |

FOREIGN PATENT DOCUMENTS

| | | |
|---|---|---|
| WO | 03/098370 A2 | 10/2003 |
| WO | WO 03/098370 * | 11/2003 |

OTHER PUBLICATIONS

Alan Conway, "Page Grammars and Page Parsing a Syntactic Approach to Document Layout Recognition", Proceedings of the second international conference on document analysis and recognition, Oct. 20-22, 1993, pp. 761-764.

Liang J et al, "Document layout structure extraction using bounding boxes of differnt entitles", Proceedings of the 3rd IEEE workshop on applications of computer vision (WACV'96) Dec. 2-4, 1996, pp. 278-283.

International Search Report, Application No. PCT/US2007/001289, Dated Jul. 9, 2007. (9 pages).

Office Action cited in related Chinese Application No. 200780005144.4 dated Mar. 31, 2010.

"Document Transformation System from Papers to XML Data Based on Pivot SML Document Method", Yasuto Ishitani, Proceedings of the Seventh International Conference on Document Analysis and Recognition, IEEE 2003, Reprinted from the Internet at: www.cse.salford.ac.uk/prima/ICDAR2003/Papers/0044_559_ishitani_y.pdf, 6 pgs.

"Sal: An Algebra for Semistructured Data and XML", Catriel Veeri and Yariv Tzaban, Reprinted from the Internet at: www-rocq.inria.fr/~cluet/WEBDB/berri.ps, 8 pgs.

"ClassAid: An Automated Lecutre Capture and Archival System", Ching-Wei Chen, Reprinted from the Internet at: vision.ece.ucsb.edu/publications/01cweithesis.pdf, 79 pgs.

* cited by examiner

500

502

```
        <Glyphs Fill="#ff333399" FontUri="font_0.TTF" FontRenderingEmSize="58.72"
StyleSimulations="None" OriginX="178.56" OriginY="207.2"
Indices="38;82;81,55;86;87,34;85;88,55;70,47;87;76,22;82;81;3;82;73;3;51;68;85;68;7
4;85;68;83;75;86,44" UnicodeString="Construction of Paragraphs" />
        <Glyphs Fill="#ff3333cc" FontUri="font_1.TTF" FontRenderingEmSize="18.72"
StyleSimulations="None" OriginX="181.76" OriginY="290.08" Indices="132,74"
UnicodeString=" " />
        <Glyphs Fill="#ff000000" FontUri="font_0.TTF" FontRenderingEmSize="32"
StyleSimulations="None" OriginX="217.76" OriginY="290.08"
Indices="38;85;76;87,34;72,52;85;76;68,53;3;87;82,53;3;68,53;71;71;3,32;68;3;55;72,5
2;91;87;3;53,61;88;81;3,32;76;81,55;87,34;82;3;68;3;83;68;8 5;68;74;85;68,53;83;75,55
" UnicodeString="Criteria to add a Text Run into a paragraph" />
        <Glyphs Fill="#ffff0000" FontUri="font_1.TTF" FontRenderingEmSize="14.72"
StyleSimulations="None" OriginX="229.76" OriginY="322.88" Indices="132,74"
UnicodeString=" " />
        <Glyphs Fill="#ff000000" FontUri="font_0.TTF" FontRenderingEmSize="26.72"
StyleSimulations="None" OriginX="259.84" OriginY="322.88"
Indices="57,59;72;85;87,34;76;70;68;79;3;70;79,22;82,55;86;72;81;72,52;86;86;3;32;3
3,72;3;36;79;79;82;90;3;26,54;24;8;3;79;76;81;72;3;75,55;72;76;74;75,55;87"
UnicodeString="Vertical closeness => Allow 75% line height" />
[portions omitted...]
        <Glyphs Fill="#ff000000" FontUri="font_0.TTF" FontRenderingEmSize="32"
StyleSimulations="None" OriginX="217.76" OriginY="575.36"
Indices="58;72,52;3,32;81;72;72,52;71,56;3;86,44;72;70;82;81;71,56;68;85;92;3;83;68;
86,44;86,44;3,32;87;82,55;3;72,52;81;86;88;85;72;3;68,53;70;70;88,55;85;68,53;70;92,
49" UnicodeString="We need secondary pass to ensure accuracy" />
        <Glyphs Fill="#ffff0000" FontUri="font_1.TTF" FontRenderingEmSize="14.72"
StyleSimulations="None" OriginX="229.76" OriginY="608.16" Indices="132,74"
UnicodeString=" " />
        <Glyphs Fill="#ff000000" FontUri="font_0.TTF" FontRenderingEmSize="26.72"
StyleSimulations="None" OriginX="259.84" OriginY="608.16"
Indices="44;87;72;85;68,53;87;72,52;3;83;68,53;85;68;74,54;85;68,53;83;75,55;86;3;6
8,53;81,55;71;3;80,83;72,52;85;74;72,52;3;68,53;81,55;92;3,32;76,22;81;87,34;72,52;8
5;86;72;70;87,34;76,22;81;74;3;82;81;72,52;86,44" UnicodeString="Iterate paragraphs
and merge any intersecting ones" />
</FixedPage>
```

FIG. 8

DETECTION OF LISTS IN VECTOR GRAPHICS DOCUMENTS

BACKGROUND

Vector graphics based document exchange formats, such as a portable document format (PDF), provide a set of rendering instructions that allow documents to be interpreted and displayed to users in a standardized fashion, without requiring a user's computer to have the original software application that the content was created in. MICROSOFT® created XML Paper Specification (XPS) as a vector graphics based document format to allow XML content to be rendered in a standardized and meaningful way. One problem with vector graphics based documents is that viewing applications may know very little about the real content of a particular document except for how to render it correctly. For example, the viewing application may have no idea that the content of the document includes one or more bulleted or numbered lists.

Lists can deliver information in ways that are easier to read and understand than plain text. The presence of lists in a vector graphics based document presents particular problems when converting the documents to more end-user-friendly formats used in destination programs. Viewing applications will have information describing how to draw the lists, but they do not necessarily have any information indicating that what they are drawing is a list, so they may be limited in their ability to read or copy the list in a way that is meaningful to the user. The issue of rendering lists meaningfully is complicated by the potential presence of nested lists, or lists within lists. Take for example, a main list, numbered 1, 2, 3. Suppose item 1 consists of items underneath it numbered a, b, and c. Within that list designated by lower case letters, "a" contains items 1) and 2)—in effect, a third list. As you can see from this example, this list actually consists of three lists from a programming standpoint.

SUMMARY

Various technologies and techniques are disclosed that allow for detecting lists within vector graphics based, including XML based, documents and rendering them in meaningful ways. Bulleted lists as well as numbered lists can be identified based on a set of rules. One or more of the disclosed technologies and techniques do this by detecting and differentiating patterns. This includes searches for characters, symbols, numbers, letters, and/or images that may start a list. The technology determines whether that signals the start of a list. Patterns are searched for in subsequent lines to determine if a list exists. Furthermore, logic is used to search for and identify nested lists. By way of example and not limitation, the technology can identify a bulleted list with a numbered list nested in it, or vice versa. The system allows content to be output to destination applications in a modified format that is more suitable for output or use by a destination application. Alternatively or additionally, lists can be recognized and translated to a screen reader that understands the input and utilizes voice output technology to make proper audible sounds to represent the list.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a diagram for one implementation of the system of FIG. 1 that illustrates a portion of a vector graphics document in an XML format designating a list.

DETAILED DESCRIPTION

Figure 1:
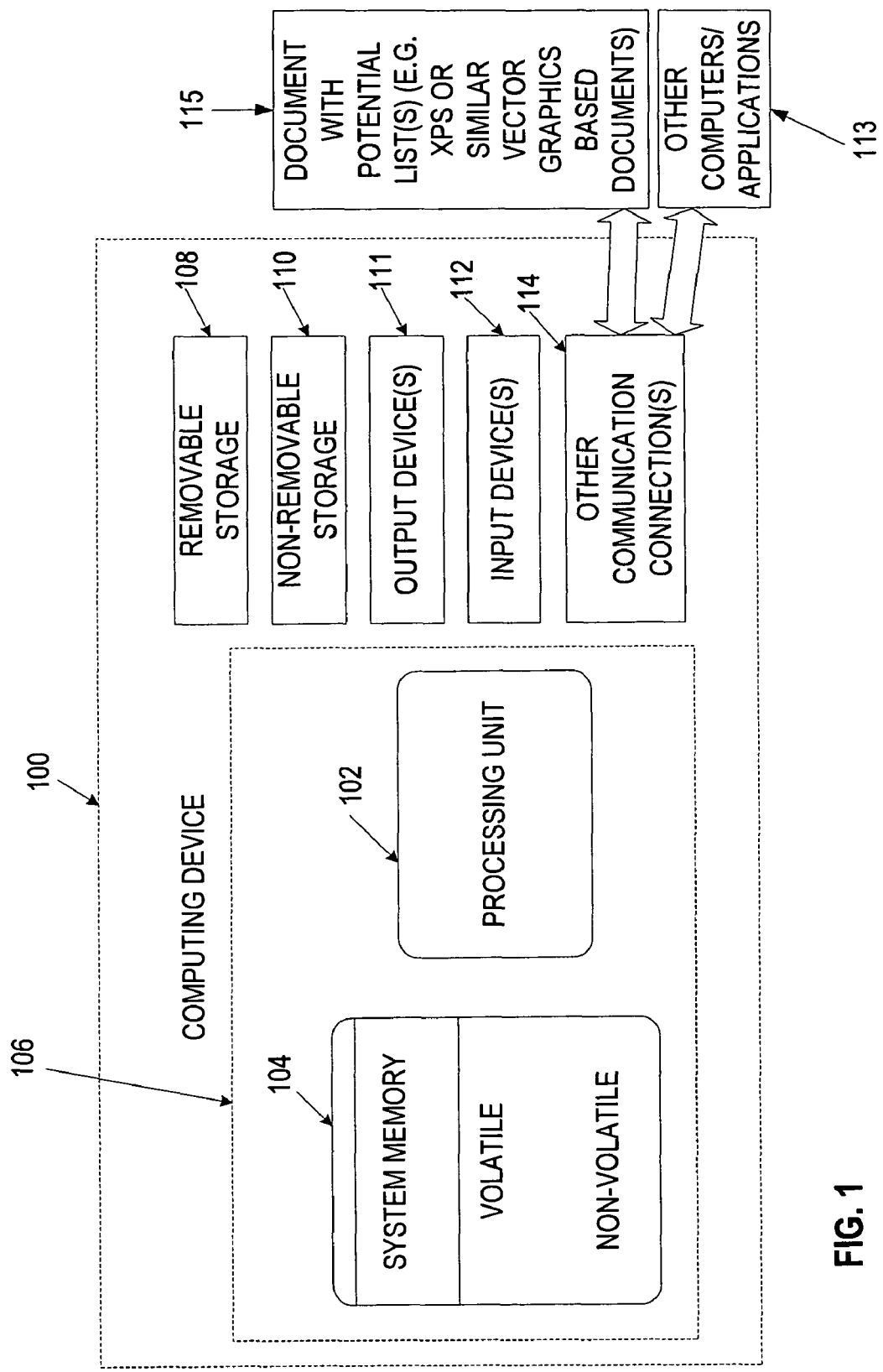
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application used to detect lists and list items based on the rendering instructions given in an XPS document or other vector graphics based document formats, but the system also serves other purposes in addition to these. One or more of the techniques described herein can be implemented as features within software programs such as MICROSOFT® Office Word, MICROSOFT® Office POWERPOINT®, Adobe Acrobat, XPS viewers, and/or from any other type of program or service that allows creation of or can utilize lists. As described in further detail herein, in one implementation of the system, lists are recognized and translated to the format used in destination documents. In another implementation, lists can be recognized and translated to a screen reader that understands the input and utilizes voice output technology to make proper audible sounds identifying the list, read the text in the list, and explain the order of the list to the person who is listening.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with one or more documents 115, such as XPS documents or other vector graphics based documents. Computing device 100 may also communicate with one or more computers and/or applications 113. Device 100 may also have input device(s) 112 such as keyboard, mouse, pen, voice input device, touch input device, etc. Output device(s) 111 such as a display, speakers, printer, screen reader, etc. may also be included. These devices are well known in the art and need not be discussed at length here.

Figure 2:
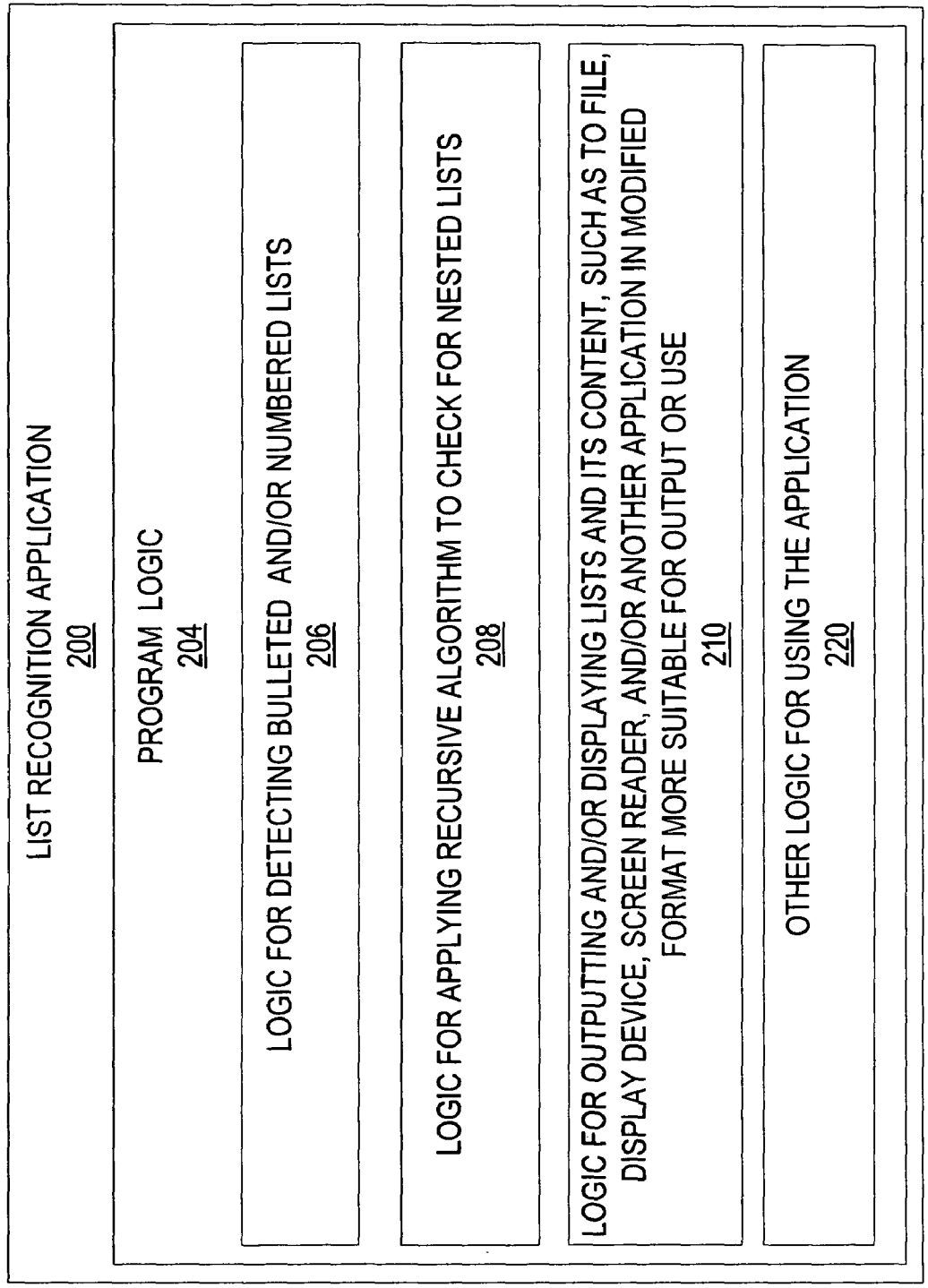
FIG. 2 is a diagrammatic view of a list resolution program operating on the computer system of FIG. 1 in one implementation.

Turning now to FIG. 2 with continued reference to FIG. 1, a list recognition application 200 operating on computing device 100 is illustrated. List recognition application 200 is one of the application programs that reside on computing device 100. Alternatively or additionally, one or more parts of list recognition application 200 can be part of system memory 104, on other computers and/or applications 113, or other such variations as would occur to one in the computer software art.

List recognition application 200 includes program logic 204, which is responsible for carrying out some or all of the techniques described herein. Program logic 204 includes logic for detecting a bulleted or numbered list 206 and for applying a recursive algorithm to detect a nested list within a list 208. Program logic 204 also includes the logic for outputting or displaying the content of the list(s) in a modified format more suitable for output or use 210, such as to a file, display device, screen reader, and/or a another application. Program logic 220 includes other logic for operating the application. In one implementation, program logic 204 is operable to be called programmatically from another program, such as using a single call to a procedure in program logic 204.

In one implementation, program logic 204 resides on computing device 100. However, it will be understood that program logic 204 can alternatively or additionally be embodied as computer-executable instructions on one or more computers and/or in different variations. As one non-limiting example, one or more parts of program logic 204 could alternatively or additionally be implemented as a web-based application that is called when needed.

Figure 3:
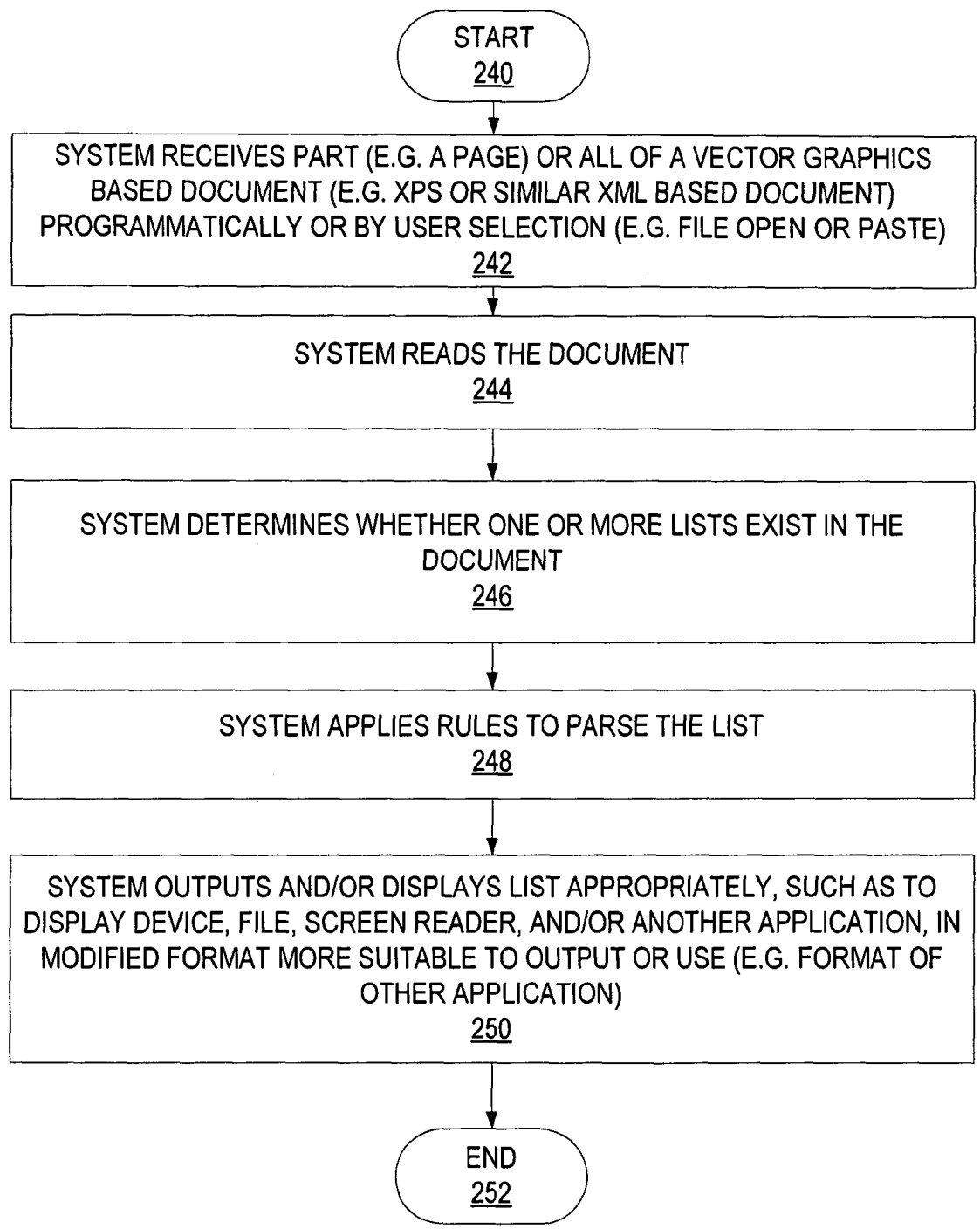
FIG. 3 is a high-level process flow diagram for one implementation of the system of FIG. 1.

Turning now to FIG. 3 with continued reference to FIGS. 1-2, the stages for implementing one or more implementations of list recognition application 200 are described in further detail. FIG. 3 is a high level flow diagram for list recognition application 200. In one form, the process of FIG. 3 is at least partially implemented in the operating logic of computing device 100. While the list recognition application 200 is described in some implementations herein as recognizing lists in XPS documents or similar XML based document formats, it will be understood that in other implementations, list recognition application 200 works with any type of document format that makes use of vector graphics. The term vector graphics based document as used herein is meant to include any type of document that includes instructions for rendering a document on an output device, such as instructions for rendering text, lines, and/or filled shapes. As another non-limiting example, rendering instructions include list rendering instructions, such as those providing details about the location of and/or content of bulleted and/or numbered list items.

The procedure begins on FIG. 3 at start point 240 with receiving a selection programmatically from a program, or from the user, to access part (e.g. a page) or all of a vector graphics based document, such as an XPS document or similar XML based document (stage 242). A few non-limiting examples of how selection is received include a file opened by a user, or a text pasted into an application by a user. In one implementation, the system reads the vector graphics based document (stage 244) and executes program logic 206 to determine whether one or more lists are present (stage 246). List recognition application 200 executes program logic 206 to parse the list (stage 248). List recognition application 200 executes program logic 210 to output the one or more lists in a modified format that is more suitable to output or use, such as to a file, screen reader, and/or another application (stage 250). In one implementation, the modified format includes a format understood by a destination application. The process ends at end point 252.

Figure 4:
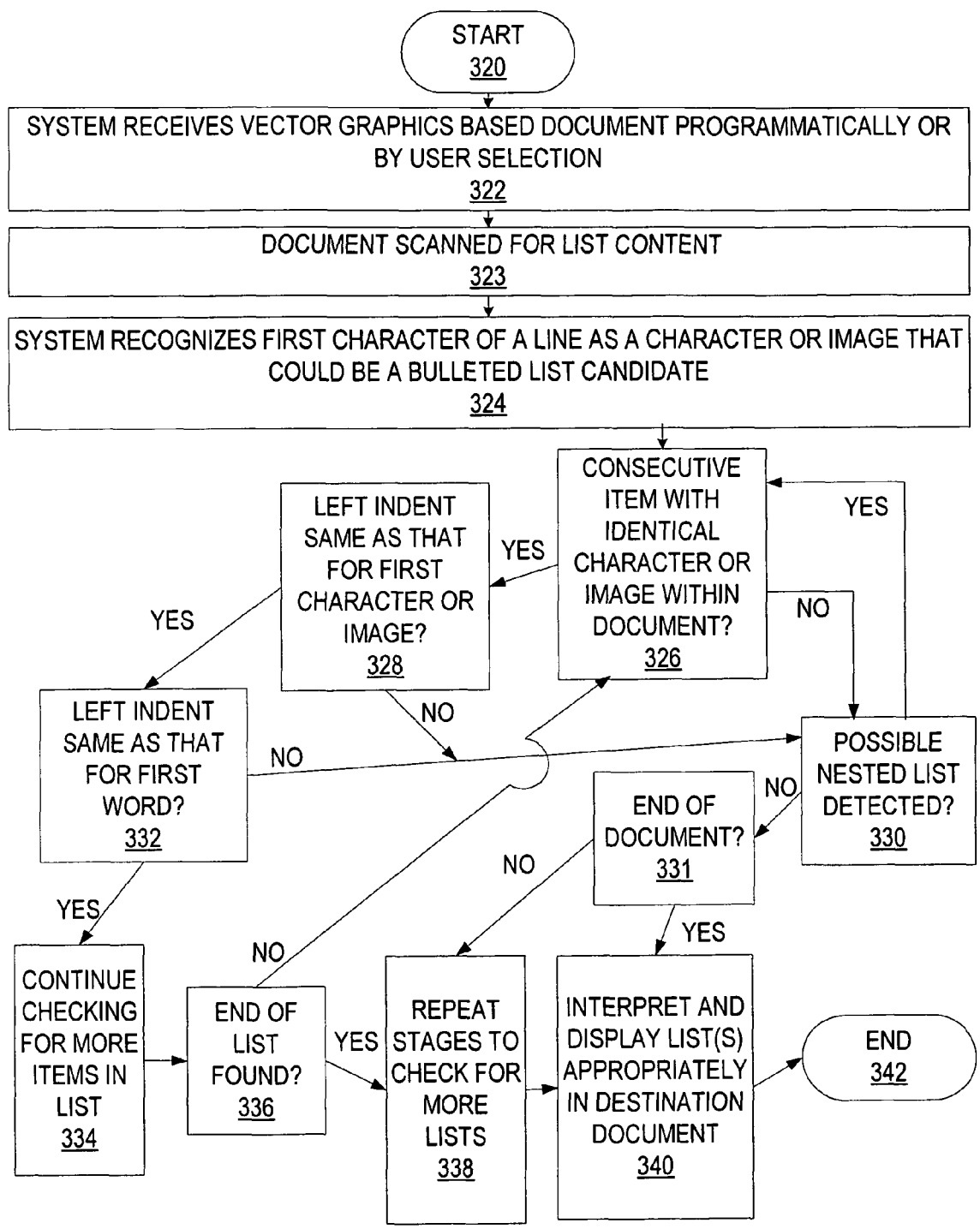
FIG. 4 is a process flow diagram for one implementation of the system of FIG. 1 illustrating the stages involved in detecting and rendering a bulleted list from vector graphics content.
Figure 5:
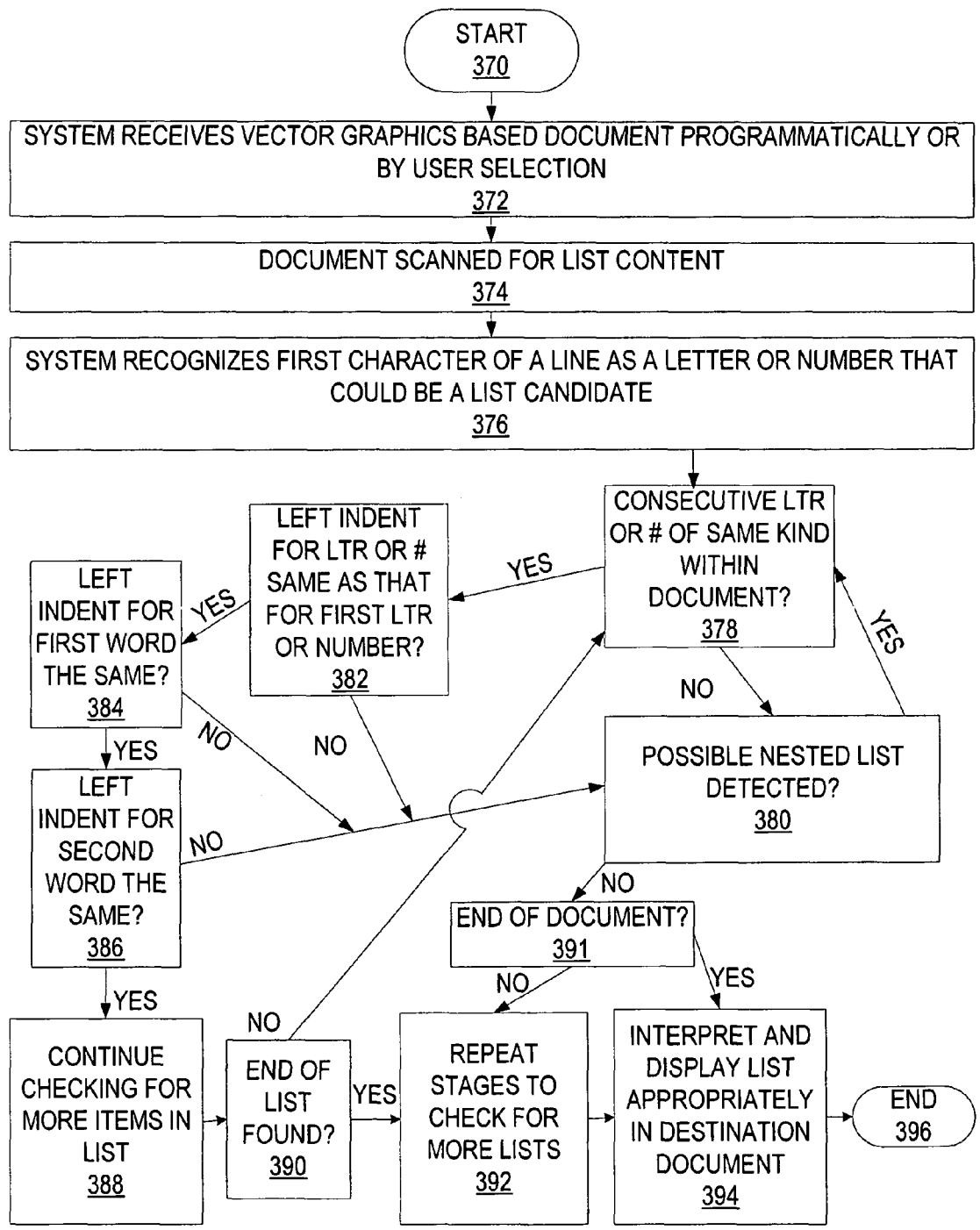
FIG. 5 is a process flow diagram for one implementation of the system of FIG. 1 illustrating the user selections and stages involved in detecting and rendering a numbered or lettered list from vector graphics content.

Turning now to FIGS. 4-5 with continued reference to FIGS. 2-3, the stages involved in detecting various kinds of lists are illustrated. FIG. 4 illustrates the stages for detecting list content in one implementation. In one form, the process of FIG. 4 is at least partially implemented in the operating logic of computing device 100. The procedure begins at start point 320 with the system receiving a vector graphics based document programmatically or by user selection (stage 322). The document content is scanned for the presence of one or more bulleted lists (stage 323).

The system detects the first character or image of a line that could be the start of a list (324). By way of example and not limitation, this character can be a hyphen (-), an asterisk (*), a greater-than sign (>), a plus sign (+), or another keyboard character or image that could signal the start of a bulleted list. The system determines if that is the start of a list by scanning the next line to see if it starts with the same character (decision point 326). If so, then additional considerations are taken to determine if both lines constitute items in a list. For example, if the left indent of the first character on the line being considered is the same as the first character on the first line (decision point 328), then the system also checks to see if the left indent is the same for the first word (decision point 332).

In one implementation, if all of these criteria are met, then the item is treated as a list item. In another implementation, some of these criteria and/or additional criteria are used to determine the item is a bulleted list item. The system continues checking for more items in the list (stage 334). If the end of the list is not found (decision point 336), then the process repeats beginning with looking for another consecutive item with an identical character or image (stage 326).

If the system evaluates the one or more various list criteria and determines the item is not part of the prior list, it then checks to see if the item is part of a nested list (decision point 330). If a possible nested list is detected (decision point 330), then the list criteria are also evaluated for the possible nested list. Once all possible lists have been identified and the end of the document is reached (decision point 331), the system executes logic for changing the content into the format of the destination document (stage 338), and displays the content appropriately (stage 340). The process ends at end point 342.

Turning now to FIG. 5 with continued reference to FIGS. 2-3, the stages for detecting and parsing content in a vector graphics based document that is a numbered or lettered list are illustrated. In one form, the process of FIG. 5 is at least partially implemented in the operating logic of computing device 100. The procedure begins at start point 370 with the system receiving a vector graphics based document programmatically or by user selection (stage 372). The document content is scanned for the presence of one or more lists (stage 374). The system detects the first number or letter of a line (stage 376) that could be the start of a list. By way of example and not limitation, this character can be a Roman numeral or an arithmetic number, a single or compound number, a capital letter or lower case letter.

The system detects if that is the start of a list by scanning the next line to see if it starts with the same character (stage 378). If so, then additional considerations are taken to determine if both lines constitute items in a list. Such considerations include, but are not limited to, whether left indentation of the number or letter (stage 382), left indentation of the first word after the number or letter (stage 384), and left indentation of the next word (stage 386) are the same for both items. In one implementation if all of these criteria are met, then the item is treated as a numbered or lettered list item. In another implementation, some of these criteria are used to determine the item is a numbered or lettered list item. The system continues checking for more items in the list (stage 388). If the end of the list is not found (decision point 390), then the process repeats beginning with looking for another consecutive item with a consecutive letter or number (stage 378).

If the system evaluates the one or more list criteria and determines the item is not part of the prior list, it then checks to see if the item is part of a nested list (decision point 380). If a possible nested list is detected (decision point 380), then the stages are repeated to look for a nested list. Once all possible lists have been identified and the end of the document is reached (decision point 391) the system executes logic for changing the content into the format of the destination document (stage 392), and displays the content appropriately (stage 394). The process ends at end point 396.

Figure 6:
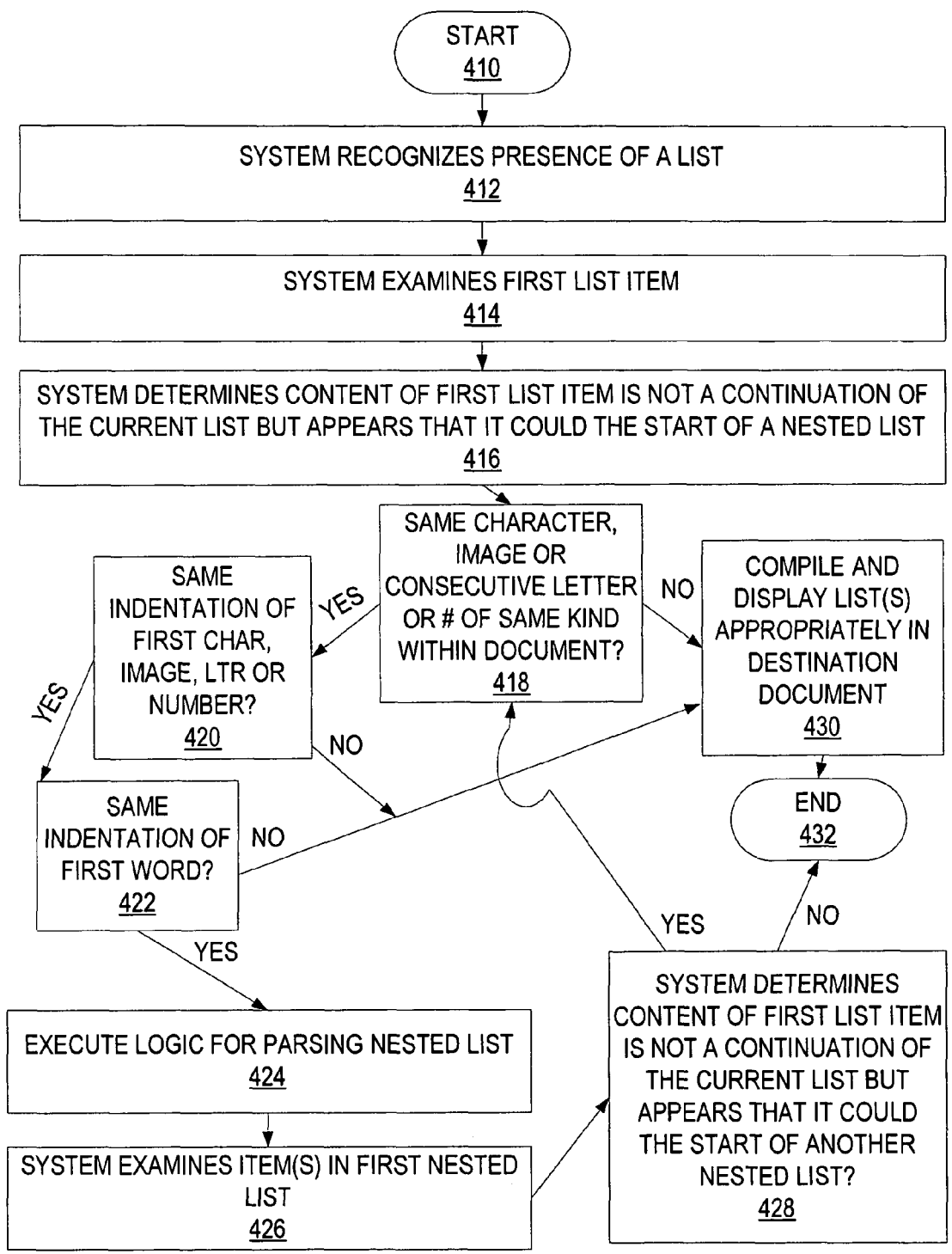
FIG. 6 is a process flow diagram for one implementation of the system of FIG. 1 illustrating the stages involved in detecting and rendering nested lists.

As discussed previously, in one implementation, the system can also detect nested lists. By way of example and not limitation, the system can detect a bulleted list within a numbered or lettered list, as well as a numbered or lettered list within a numbered or lettered list. FIG. 6 is a process flow diagram for one implementation that illustrates one or more stages involved in detecting nested lists and displaying them correctly. In one form, the process of FIG. 6 is at least partially implemented in the operating logic of computing device 100. In one implementation, this process can identify any number of nested lists existing at multiple levels within other lists. The process starts at start point 410 with the system recognizing the presence of a list (stage 412) and the start of the first list item (stage 414). The system recognizes that the first item is not a continuation of a previously-recognized list, but may be the first item of a nested list (stage 416). Rules are applied to check the next line to see if it is part of a nested list. These rules include, but are not limited to, checking the first character of the next line (stage 418), the indentation of the first character of the next line (stage 420), and the indentation of the first word after the character of the next line (stage 422). If two or more items are found that meet all these criteria, then rules for parsing a nested list are executed (stage 424).

The items in this nested list are examined as well (stage 426) to see if more than one level of nesting exists. If this is found (stage 428), then the system executes a recursive algorithm to check for items in a second level of nested list. This continues until all items are identified for all levels of lists. The items are grouped accordingly, and are compiled so that they can be displayed accurately onscreen or in print in the destination application (stage 430). The process ends at end point 432.

Figure 7:
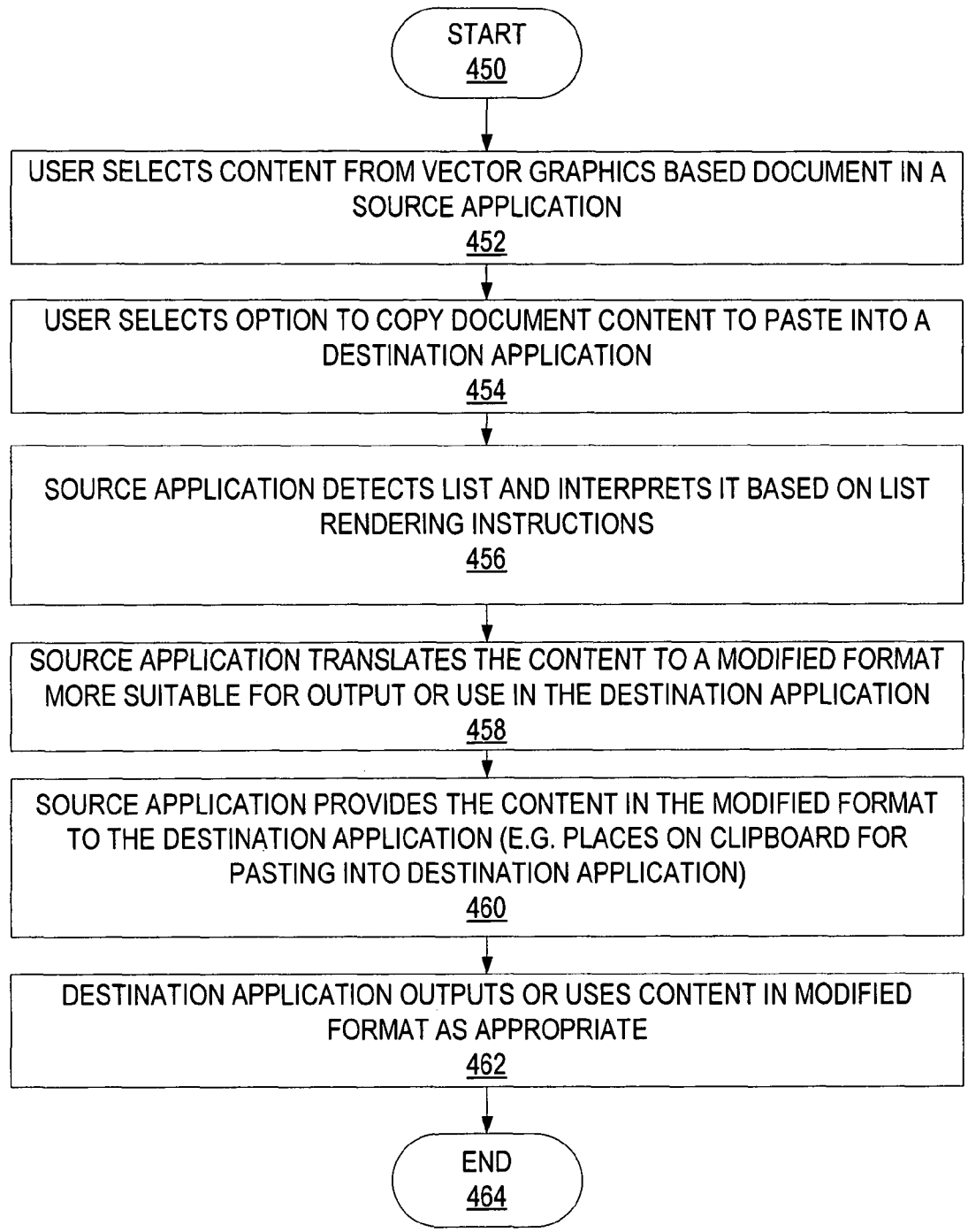
FIG. 7 is a flow diagram for one implementation of the system of FIG. 1 that illustrates the copying and pasting process from a vector graphics based document to a destination application and rendering lists in the destination application.

FIG. 7 is a high-level flow diagram illustrating the process that a user would employ to copy and paste list content from a vector graphics based document into a destination application or document that utilizes a different format. In one form, the process of FIG. 7 is at least partially implemented in the operating logic of computing device 100. The process starts at start point 450, when the user selects content from a vector graphics based document in a source application (stage 452). The user selects an option to copy the content to paste into a destination application (stage 454). The source application detects the presence of a list and interprets the list based on list rendering instructions present in the document (stage 456). The source application translates the content to a modified format that is more suitable for output or use in the destination application (stage 458). A few non-limiting examples of modified content include rich text, XML that does not include rendering instructions, a graphic representation of some or all of the content, and numerous other variations. The source application provides the modified content to the destination application (stage 460). As one non-limiting example, the source application can provide the modified content by placing it on a clipboard that can be used to paste the content into the destination application programmatically or by user selection. The destination application outputs or uses the modified content appropriately, such as rendering it on an output device for a user (stage 462). The process ends at end point 464.

Figure 9:
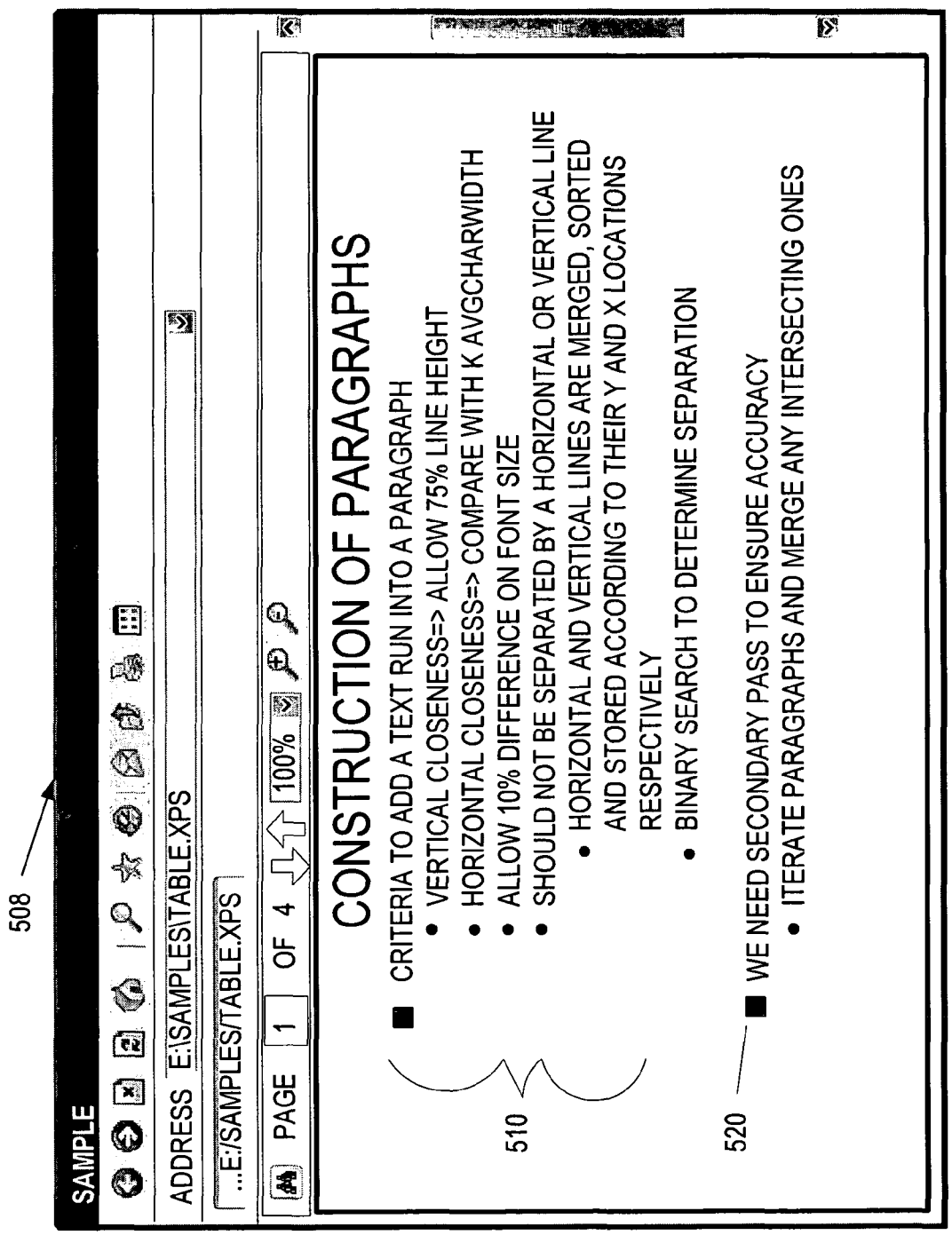
FIG. 9 is a simulated screen for one implementation of the system of FIG. 1 that illustrates how the XML code of FIG. 8 containing lists is visualized by a document rendering utility.
Figure 10:
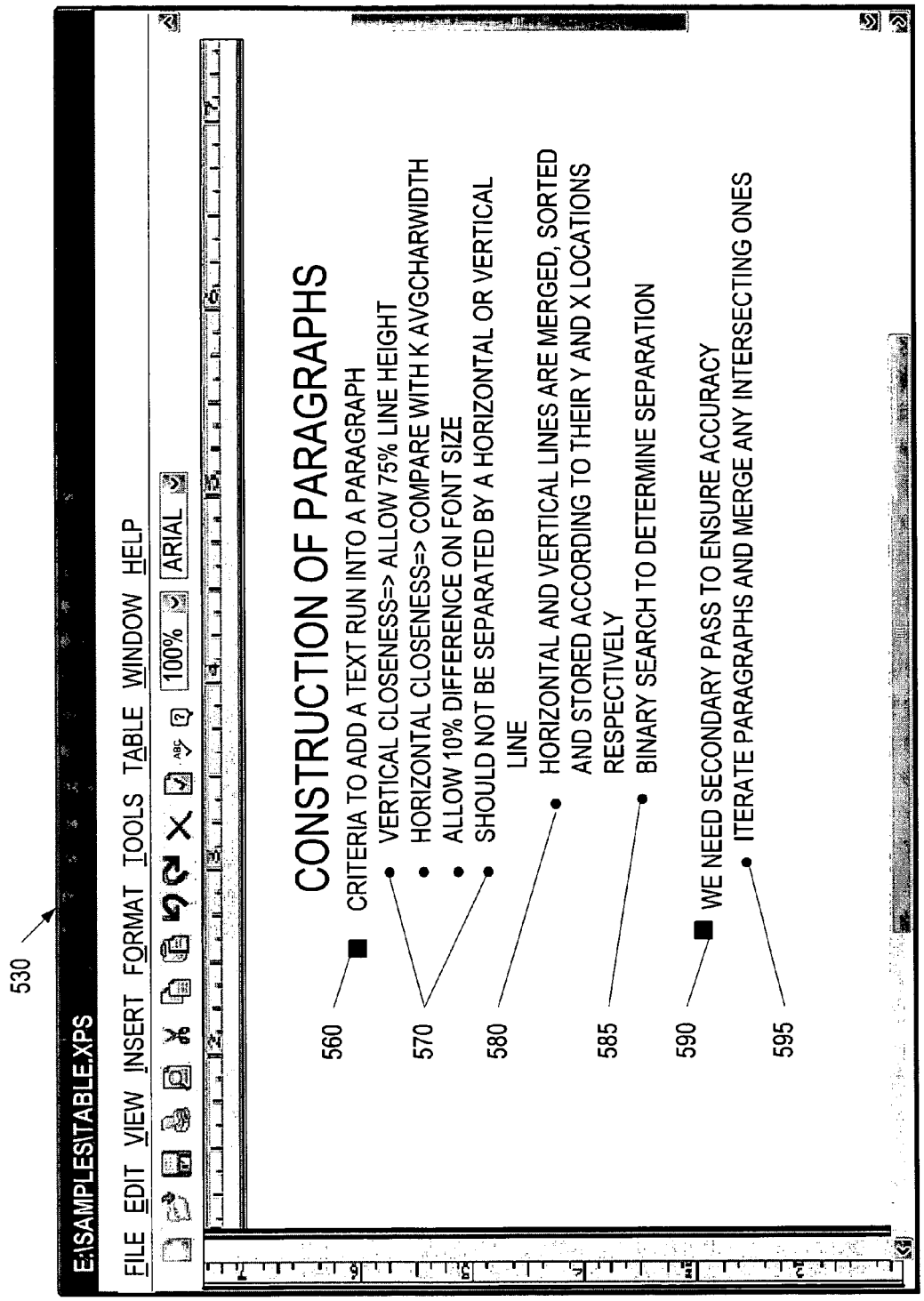
FIG. 10 is a simulated screen for one implementation of the system of FIG. 1 showing how XML list content of FIG. 8 is rendered after being copied to another application which uses a different document format.

Turning now to FIGS. 8-10, simulated diagrams and screens are shown to illustrate one implementation of native XML code and tags, as well as how the XML code is interpreted by a source application, such as a viewer, and then displayed in a destination application. FIG. 8 shows XML code 500 for part of a document, which may, in one implementation, be received from a source such as an XPS document or other vector graphics based document 115. In the example shown, the XML code is written using an XML paper specification (XPS) syntax. In the example shown, document 500 includes various tags, such as tag 502, that include specifications for particular list items. Numerous other list designators could also be used. Furthermore, some, all, additional, and/or other tags and/or text contents could be used within document 500. In other implementations, XML tags are not used at all.

FIG. 9 shows simulated screen 508 for one implementation that illustrates how XML content 500 is displayed in a more user-friendly fashion in a viewer application. Note that bullet symbols 510 and 520 are used to graphically illustrate the lists.

FIG. 10 shows simulated screen 530 for one implementation that displays XML content in a destination application that was copied, translated, and pasted in a destination application, or just opened from the destination application and then translated. Note that the main list 560 as well as nested lists 570, 580, and 585 are displayed, each with different bullets and indentation according to whether the list is nested or not. The beginning of a second list 590, with an accompanying nested list 595 is also shown.

Figure 11:
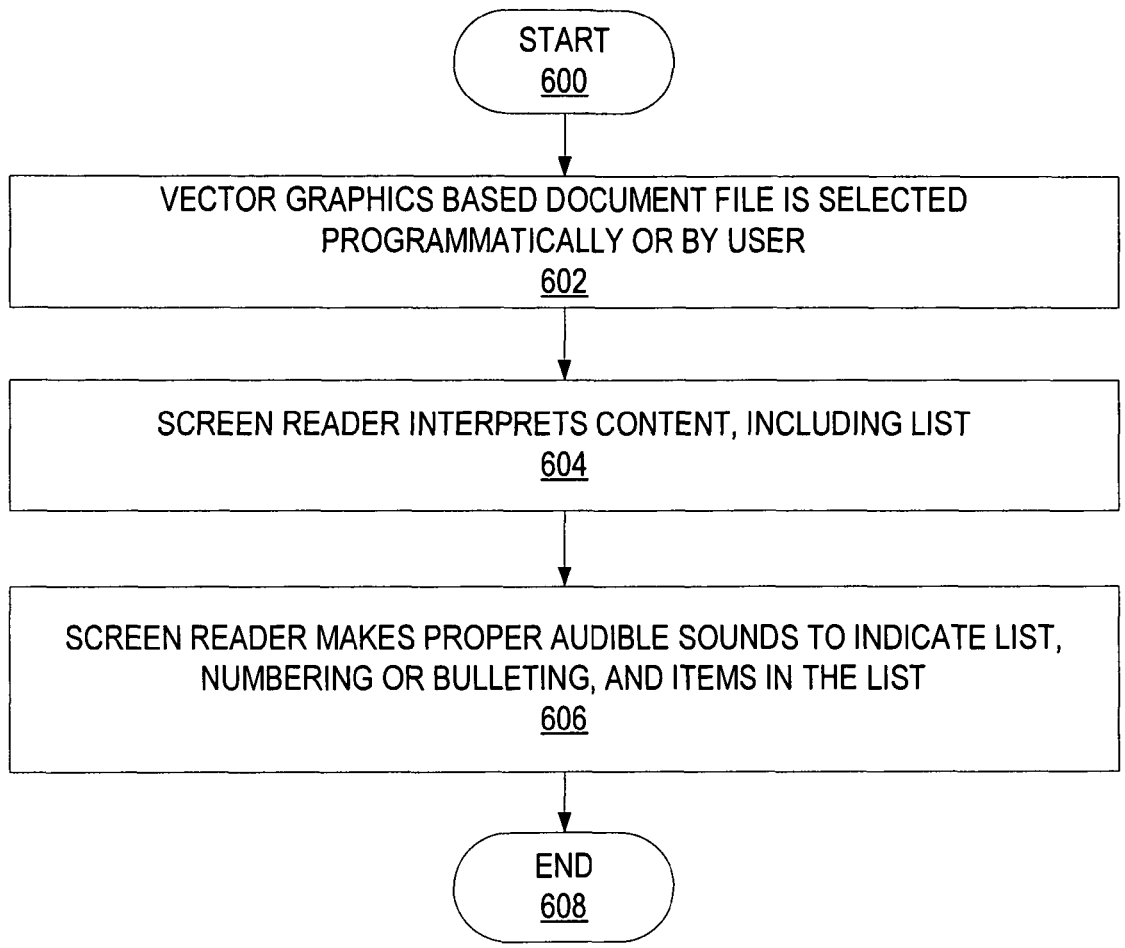
FIG. 11 is a flow diagram for one implementation of the system of FIG. 1 that illustrates a screen reader rendering audible output for a list.

FIG. 11 shows a flow diagram of one form of a screen reader using list recognition program 200 in one implementation. In one form, the process of FIG. 11 is at least partially implemented in the operating logic of computing device 100. A screen reader describes what is on a computer screen for someone who cannot clearly see the screen. Screen readers are helpful tools to visually impaired people. The process begins at start point 600, where the user or the system selecting content in a vector graphics based document (stage 602). The screen reader interprets the document content, including the list (stage 604) and audibly relays the information in a meaningful way (stage 606). By way of example and not limitation, a screen reader's audible output for a bulleted list could include these spoken words: "Bulleted list. First bullet: [read the text]; second bullet: [read the text]." By way of another example and not limitation, a screen reader's audible output for a numbered list could include these spoken words: "Numbered list. Item number 1: [read the text]; item number 2: [read the text]." Numerous other variations are also possible. The process then ends at end point 608.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for recognizing a list in a vector graphics based document comprising:

receiving the vector graphics based document in an original format, the original format having a set of list rendering instructions for at least one list in the vector graphics based document;

parsing the vector graphics based document to determine that the at least one list exists in the vector graphics based document, wherein the parsing comprises identifying a plurality of list items, the list items identified based upon a same word indentation for a first word of respective list items, wherein the first word of respective list items follow at least one of a letter, number, and symbol indicative of the list item; and outputting the list to an output medium in a modified format, where the modified format is chosen based on the particular output medium.

2. The method of claim 1, wherein the vector graphics based document is stored in an XML based document format.

3. The method of claim 1, wherein the output medium is selected from a group consisting of a display device, a file, a screen reader, and a separate application.

4. The method of claim 1, wherein the at least one list is a bulleted list.

5. The method of claim 1, wherein the at least one list is a numbered list.

6. The method of claim 1, wherein the list items are identified based upon at least one of a same first character of the respective list items and a same indention of the first character of the respective list items.

7. The method of claim 1, wherein the list items are identified based upon at least one of a sequential first character of the respective list items and a same indentation for the sequential first character of the respective list items.

8. The method of claim 1, wherein parsing the vector graphics based document is configured to detect one or more nested lists, and wherein outputting the list comprises outputting the one or more nested lists in the modified format.

9. The method of claim 1, wherein the vector graphics based document is received when a user selects an option to copy a portion of the vector graphics based document to a destination application; wherein the parsing of the vector graphics based document is performed by a source application; wherein the modified format is created by the source application and then transmitted to the destination application for outputting to the output medium; and wherein the modified format is a format used by the destination application.

10. The method of claim 1, wherein parsing the vector graphics based document to determine that the at least one list exists in the vector graphics based document comprises:

parsing a first line of the vector graphics based document to detect a character of a first list item;

parsing a second line of the vector graphics based document to detect a character of a second list item, wherein the second list item is different than the first list item, wherein the character of the second list item is at least one of a character identical to the character of the first list item and a character sequential to the character of the first list item;

verifying that the first and second list items are items of the at least one list, the verification comprising comparing a left indent of the character of the first list item with a left indent of the character of the second list item; and determining that the at least one list exists based upon the verification.

11. The method of claim 1, wherein the list is output in a first modified format when the list is output to a first output medium and is output in a second modified format when the list is output to a second output medium, wherein the first modified format is different than the second modified format and the first output medium is different than the second output medium.

12. The method of claim 1, wherein the first word of respective list items comprise at least two letters.

13. A computer-readable storage medium having computer-executable instructions that when executed by a processor of a computing system perform a method comprising:

detecting at least one list within a vector graphics based document using a set of rules, the rules comprising:

detecting whether a bulleted list is present by applying a first logic to determine if a plurality of list items have a same first character, have a same indention of for the first character, and have a same word indentation for a first word, wherein the first word of respective list items follow the first character of the respective list items; and detecting whether a numbered list is present by applying a second logic to determine if the plurality of list items have a sequential first character, have the same indentation for the first character, and have a same word indentation for a first word, wherein the first word of respective list items follow the first character of the respective list items;

translating the at least one list to a modified format; and outputting the modified format to an output medium.

14. The computer-readable storage medium of claim 13, wherein the vector graphics based document is an XML document.

15. The computer-readable storage medium of claim 13, wherein the output medium is selected from a group consisting of a display device, a file, a screen reader, and a separate application.

16. The computer-readable storage medium of claim 13, wherein the at least one list is a bulleted list.

17. The computer-readable storage medium of claim 13, wherein the at least one list is a numbered list.

18. The computer-readable storage medium of claim 13, wherein at least one of the first and the second logic detect an item that is not part of a first list, comprising detecting whether the item is part of a nested list by applying at least one of a third logic and a fourth logic, wherein the third logic is substantially similar to the first logic and the fourth logic is substantially similar to the second logic.

19. A method for interpreting a vector graphics based document comprising:

receiving an input from a user to copy a section of content, the content having an original format that includes a set of list rendering instructions;

interpreting the list rendering instructions to detect that at least one list exists in the vector graphics based document, wherein a list is detected based upon a same word indentation for a first word of respective list items, wherein the first word of respective list items follow at least one of a letter, number, and symbol indicative of the list item;

translating the content into a modified format, wherein the modified format is chosen based on a destination application; and providing the content in the modified format to the destination application for output.

20. The method of claim 19, wherein a first list is detected, the first word of respective list items having a first word indentation, the method comprising interpreting the list rendering instructions to detect at least one nested list within the first list, wherein the nested list is detected when the first word of respective nested list items have a second word indentation, the second word indentation different than the first word indentation, wherein the first word of respective nested lists items follow at least one of a letter, number, and symbol indicative of the list item.

* * * * *

UNITED STATES PATENT AND TRADEMARK OFFICE
CERTIFICATE OF CORRECTION

PATENT NO. : 7,836,399 B2  
APPLICATION NO. : 11/351065  
DATED : November 16, 2010  
INVENTOR(S) : Ahmet Gurcan et al.

Page 1 of 1

It is certified that error appears in the above-identified patent and that said Letters Patent is hereby corrected as shown below:

In column 9, line 3, in Claim 13, before "for" delete "of".

Signed and Sealed this  
Fifteenth Day of February, 2011

David J. Kappos  
*Director of the United States Patent and Trademark Office*